W. B. TERRY.
SCRAPER.
APPLICATION FILED JUNE 22, 1920.
1,402,460.
Patented Jan. 3, 1922.
3 SHEETS—SHEET 3.
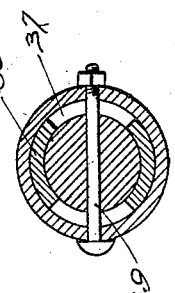
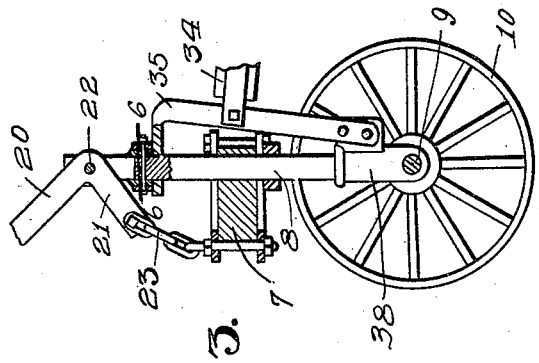
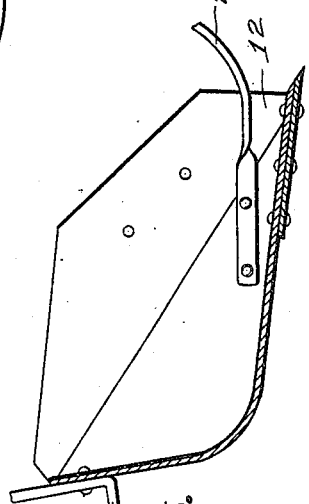
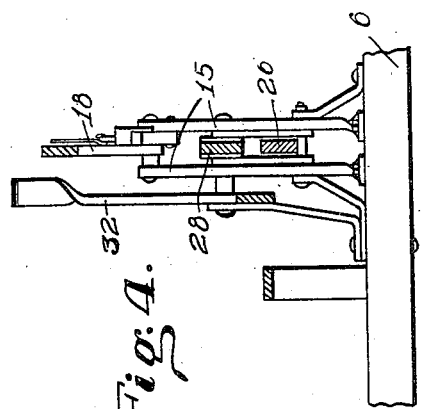
Inventor
W. B. Terry.
Witness
By
Attorneys

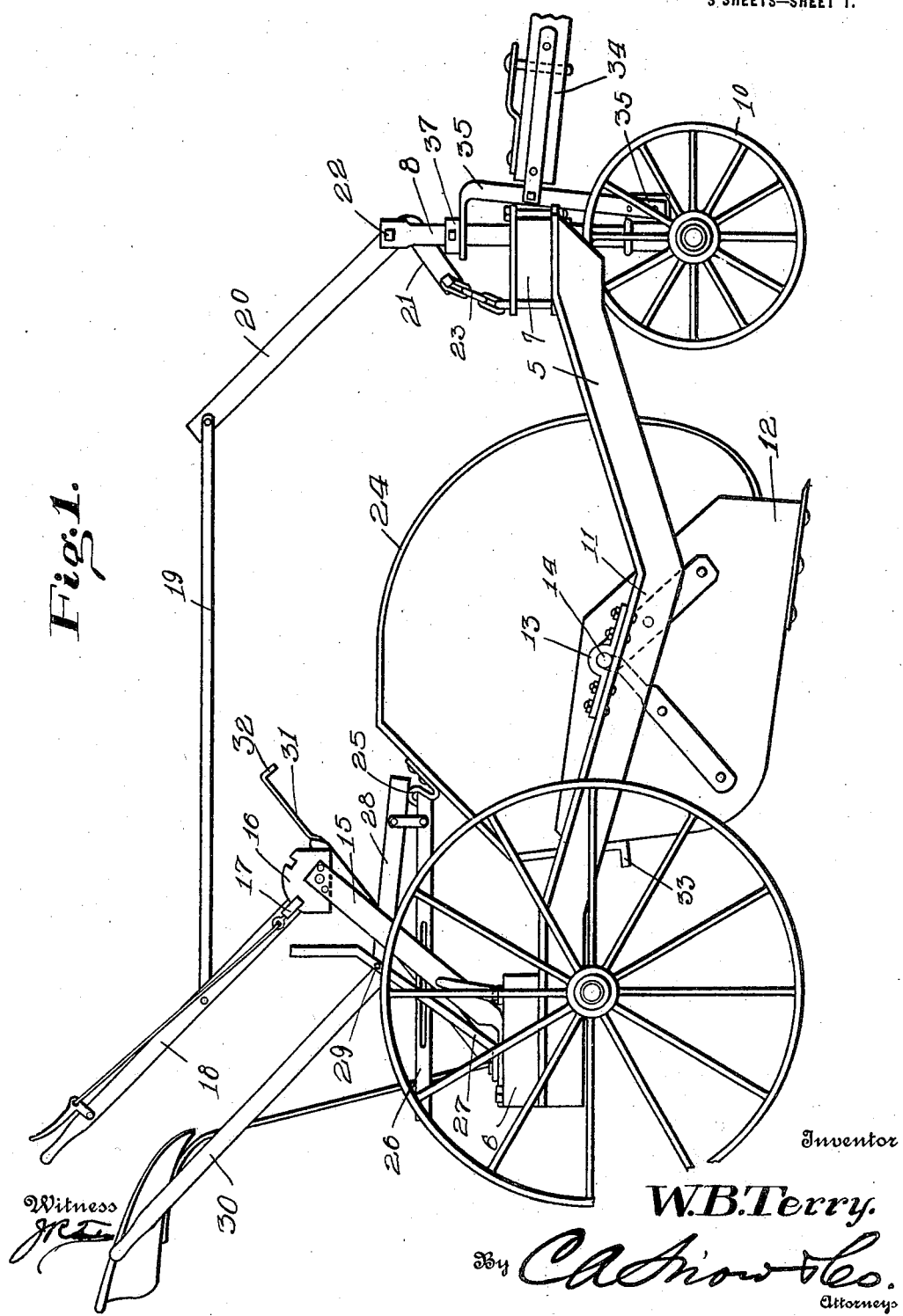

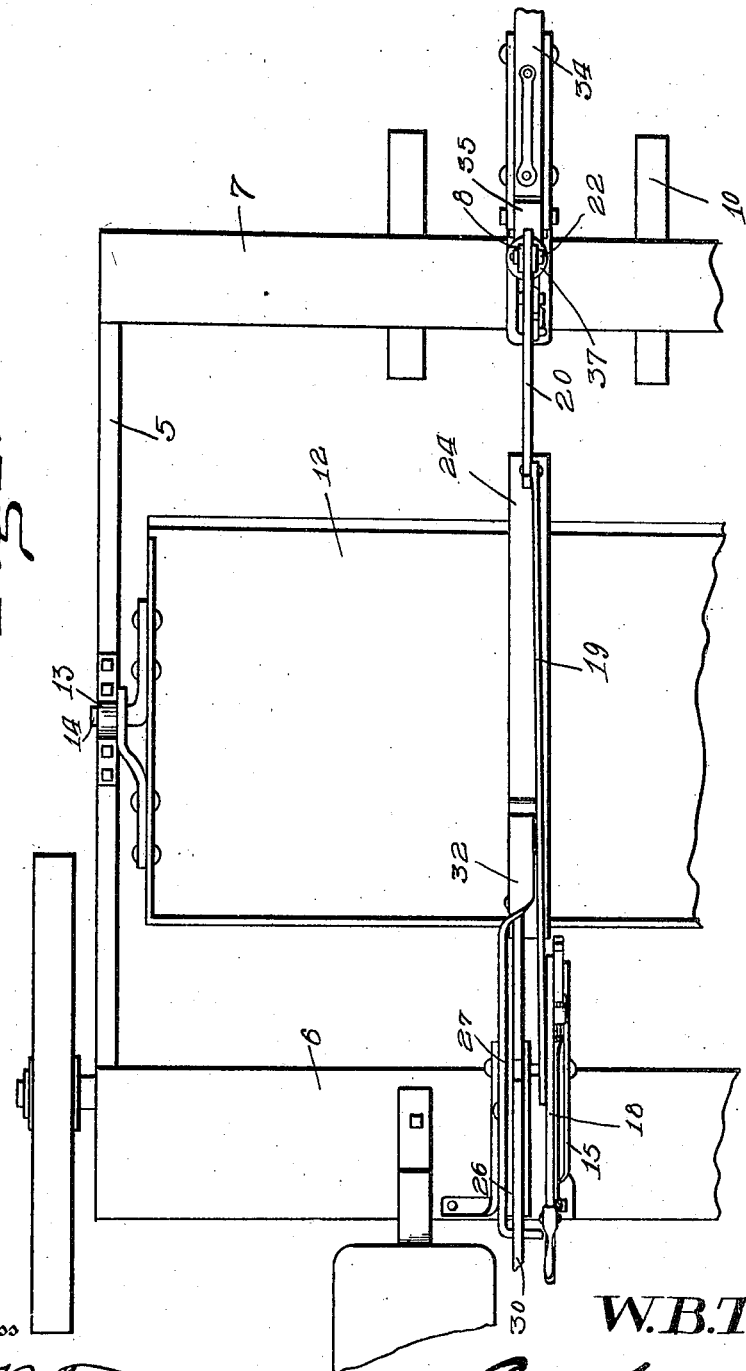

UNITED STATES PATENT OFFICE.

WILLARD B. TERRY, OF SALT LAKE CITY, UTAH.

SCRAPER.

1,402,460. Specification of Letters Patent. Patented Jan. 3, 1922.

Application filed June 22, 1920. Serial No. 390,697.

*To all whom it may concern:*

Be it known that I, WILLARD B. TERRY, a citizen of the United States, residing at Salt Lake City, in the county of Salt Lake and State of Utah, have invented a new and useful Scraper, of which the following is a specification.

This invention has reference to earth scraping machines, and more particularly to machines especially designed for use in road constructions, to accomplish the grading or scraping result.

The primary object of the invention is to provide means to facilitate the operation of the scoop to permit of the easy and efficient operation thereof, with a minimum amount of exertion on the part of the operator.

A further object of the invention is to provide a machine of this character having means to permit the frame of the machine and scoop carried thereby, to be operated simultaneously, to move the frame into spaced relation with the ground surface over which the same is operating.

A still further object of the invention is to provide means for adjusting the frame with relation to the ground surface, independently of the operation of the scoop.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 1 is a side elevational view of a scraper constructed in accordance with the present invention.

Figure 2 is a fragmental plan view of the scraper.

Figure 3 is a detail view of the front wheel and its supporting means disclosing the means for adjusting the forward portion of the frame of the scraper.

Figure 4 is a sectional view taken on line 4—4 of Figure 1.

Figure 5 is a longitudinal sectional view through the scoop proper.

Figure 6 is a sectional view on line 6—6 of Fig. 3.

Referring to the drawings in detail, the frame of the scraper includes a pair of side bars 5 which are connected at the rear ends thereof by means of the transversely extending beam 6, the forward end of the side bars 5 being connected by the beam 7, that has an opening to receive the king bolt 8, which is relatively long, the lower extremity thereof having connection with the axle 9 on which operates the front wheel 10.

Each of the side bars 5 is provided with a depressed portion 11, so that the scoop 12 which is supported thereby, will be normally supported in a scooping position with relation to the ground surface over which the same is moving, there being provided bearing members 13, supported on each of the side members 5, to receive the pintles 14, which are secured to the sides of the scoop proper.

Having connection with the beam 6 are the upwardly extending bars 15, which support the keeper 16 at the upper extremity thereof, the keeper 16 being provided with suitable notched portions to receive the bolt 17, carried by the controlling lever 18, for locking the controlling lever in predetermined positions of adjustment. A bar 19 has one of its ends pivotally connected to the controlling lever 18, the opposite end thereof being pivotally connected with the relatively long arm 20 of the bell crank lever 21, the bell crank lever 21 being however pivotally supported adjacent to the upper extremity of the king bolt 8, as at 22.

As shown the bell crank lever 21 has connection with the forward portion of the frame of the scraper through the medium of the chain 23, so that movement of the bell crank lever 21 will result in a relative movement of the forward portion of the frame of the scraper longitudinally of the king bolt 8, to the end that the scoop 12 is raised or lowered and adjusted with relation to the surface under operation.

The scoop 12 is provided with the usual guard 24, to which is secured the hook member 25 which accommodates the clamping bar 26 supported by the supporting member 27, a clamping bar 26 being constructed to cooperate with the clamping bar 28, which in turn is pivoted to the supporting member 27 as at 29, the lever 30 forming a part of the clamping bar 28 being provided to operate the bars 28 and 26, to release the scoop 12 and permit the same to move into the ground surface. Supported by the beam 6, is a catch bar 31 provided with a right angled end 32 adapted to contact with the right angled portion 33 of the guard 24, when the scoop 12 is moved to a discharging position. Thus it will be seen that the scoop is maintained in such discharging position until the right angled end 32 is disengaged from the portion 33, by the operator.

It might be further stated that the king bolt 8 has its lower end supported in the socket member 38 to move therein, the socket member having connection with the connecting bar 35, which in turn has its upper extremity apertured to accommodate the king bolt 8, which upper extremity also has connection with the collar 36 that is provided with cut out portions 37 in opposite sides thereof to accommodate the bolt 39, which connects the bar 35 to the king bolt 8 in a manner to permit rotary movement of the socket member 38 and connecting bar 35 with relation to the king bolt.

It is believed that in view of the foregoing description and drawings, the operation of the device will be clearly obvious and further detail description of the scoop is unnecessary.

What is claimed as new is:—

1. In an earth scraping machine, front and rear axles, a king bolt supported by the front axle, a frame having connection with the rear axle, said frame having its forward end connected to the king bolt in a manner to permit vertical movement of the frame with respect to the king bolt, an operating arm having pivotal connection with the king bolt at the upper end thereof, and having connection with the forward end of the frame, means for adjusting the operating arm to adjust the forward portion of the frame, and a scraping element carried by the frame.

2. In an earth scraping machine, front and rear axles, wheels on the axles, a king bolt supported by the front axle, a frame having connection with the rear axle and carrying a beam at the forward end thereof, said beam having an opening to accommodate the king bolt, and means having connection with the forward portion of the frame for adjusting the frame vertically, and a scraping element carried by the frame.

In testimony that I claim the foregoing as my own, I have hereto affixed my signature in the presence of two witnesses.

WILLARD B. TERRY.

Witnesses:
H. A. SMITH, Jr.,
NORMA JOHNSON.